US012796677B2

(12) United States Patent
Subramanian et al.

(10) Patent No.: US 12,796,677 B2
(45) Date of Patent: Nov. 17, 2026

(54) IMPLEMENT FAILURE DETECTION AND ADAPTIVE REPLAN FOR AN AGRICULTURAL VEHICLE

(71) Applicant: DEERE & COMPANY, Moline, IL (US)

(72) Inventors: Shriraam Prabu Subramanian, Pune (IN); Ashwini Ganpat Jadhav, Pune (IN)

(73) Assignee: Deere & Company, Moline, IL (US)

( * ) Notice: Subject to any disclaimer, the term of this patent is extended or adjusted under 35 U.S.C. 154(b) by 208 days.

(21) Appl. No.: 18/738,355

(22) Filed: Jun. 10, 2024

(65) Prior Publication Data

US 2025/0374908 A1 Dec. 11, 2025

(51) Int. Cl.

| | |
|---|---|
| ***A01M 7/00*** | (2006.01) |
| ***A01B 69/04*** | (2006.01) |
| ***A01G 7/06*** | (2006.01) |

(52) U.S. Cl.

CPC ......... *A01M 7/0096* (2013.01); *A01B 69/008* (2013.01); *A01G 7/06* (2013.01); *A01M 7/0042* (2013.01)

(58) Field of Classification Search

CPC ... A01B 79/0905; A01B 79/02; A01B 69/008; A01M 7/0096; A01M 7/0042; A01G 7/06

See application file for complete search history.

(56) References Cited

U.S. PATENT DOCUMENTS

| | | | | |
|---|---|---|---|---|
| 6,434,462 | B1 | 8/2002 | Bevly et al. | |
| 9,635,798 | B2 | 5/2017 | Merx et al. | |
| 9,891,629 | B2 | 2/2018 | Murray et al. | |
| 10,185,317 | B2 | 1/2019 | Pichlmaier et al. | |
| 11,727,680 | B2 | 8/2023 | Vandike et al. | |
| 2009/0326763 | A1 | 12/2009 | Rekow | |
| 2016/0000004 | A1* | 1/2016 | Ni | B05B 12/008 73/204.11 |
| 2022/0034859 | A1 | 2/2022 | Rupp et al. | |
| 2022/0198643 | A1* | 6/2022 | Sharma | G06F 18/24 |

FOREIGN PATENT DOCUMENTS

WO WO-0116661 A1 * 3/2001 .......... A01M 7/0089

* cited by examiner

*Primary Examiner* — Steven M Sutherland

(74) *Attorney, Agent, or Firm* — Taft Stettinius & Hollister LLP; Stephen F. Rost

(57) ABSTRACT

An agricultural work system for dispensing agricultural product to a field in a plurality of passes based on a field plan. The agricultural work system includes an implement including a plurality of row units, wherein each of the plurality of row units is configured to dispense the agricultural product to the field in rows across a width of the one of the plurality of passes. A product delivery system is configured to deliver the agricultural product to the plurality of row units. A sensor system directed to the plurality of row units to identify a lack of the agricultural product being dispensed from one or more of the plurality of row units and a controller is operatively connected to the sensor system. The controller is configured to facilitate providing a modified field plan for dispensing the product to the field, wherein the modified field plan identifies a coverage gap.

16 Claims, 6 Drawing Sheets

IMPLEMENT FAILURE DETECTION AND ADAPTIVE REPLAN FOR AN AGRICULTURAL VEHICLE

FIELD OF THE DISCLOSURE

The present disclosure relates to an agricultural product delivery system, and in particular, to an agricultural work vehicle having a planter or seeder.

BACKGROUND

An agricultural machine may include an agricultural fertilizer spreader implement or agricultural seed planter implement that deposits fertilizer in rows or seed in rows as the implement is pulled by a work vehicle, such as a tractor, through an agricultural field for planting. Combination fertilizer spreaders/planter deposit fertilizer in rows followed by planting seeds along the same row that have received the fertilizer. In some implementations of agricultural machines, the fertilizer spreader precedes a row crop planter such that the ground is fertilized prior to the seeds being deposited.

The agricultural implement typically includes a plurality of row units coupled one or more bars supported by tires. A combination of one bar and its row units is also known as a rank. Some agricultural implements include a single rank and other agricultural implements include two or more ranks. The bar or bars are inclined with and extend substantially perpendicular to the direction of travel of the work vehicle when pulled through the agricultural field. In the case where fertilizing and/or seeding occurs, a plurality of row units are aligned side by side along one of the bars. In other implementations, multiple bars are located in parallel with one bar following the other to form a multi-rank implement.

In one implementation, a single bar agricultural implement includes eleven row units on either side of a central location of the implement. The row units are spaced equally apart along the bar. In an agricultural implement configured to either only fertilize, to deposit seeds, or to both fertilize and deposit seeds, the fertilizer row units and seeding row units of the implement are aligned and deposit product (fertilizer or seed) substantially parallel to the travel direction of the tractor when being pulled through a field.

The row units includes nozzles that are configured to deliver products including one or both of fertilizer or seed. The product being delivered to and distributed by the nozzles to the field may not, however, be applied uniformly. The non-uniform application of the product is not desirable and can result from the implement being faulty, damaged, damaged or blocked. When this occurs, gaps in coverage of product may occur. To remedy the lack of coverage, the gaps in coverage may be filled in with material that that was not applied as intended.

SUMMARY

In one implementation, there is provided an agricultural work system for dispensing agricultural product to a field in a plurality of passes based on a field plan. The agricultural work system includes an implement having a plurality of row units defining an implement width of one of the plurality of passes, wherein each of the plurality of row units is configured to dispense the agricultural product to the field in rows across the width of the one of the plurality of passes. A product delivery system is operatively connected to the plurality of row units and is configured to deliver the agricultural product to the plurality of row units. A sensor system is directed to the plurality of row units, wherein the sensor system is configured to transmit a first signal configured to identify a lack of the agricultural product being dispensed from one or more of the plurality of row units. A controller is operatively connected to the sensor system and is configured to: identify a non-working plurality of the plurality of row units that fail to deliver a sufficient amount of agricultural product based on the first sensor signal; identify a working plurality of the plurality of row units that deliver a sufficient amount of agricultural product based on the first sensor signal; and facilitate providing a modified field plan for dispensing the product to the field, wherein the modified field plan identifies a field location of the reduced plurality of row units that fail to deliver the sufficient amount of agricultural product when dispensing the agricultural product to the field.

In some implementations, the agricultural work system includes wherein the identified field location includes identifying a coverage gap having a width based on the one or more rows of the modified field plan that that lack the sufficient amount of product.

In some implementations, the agricultural work system includes wherein the coverage gap includes a plurality of rows wherein each of the rows corresponds to one of the reduced plurality of row units that fail to deliver the sufficient amount of product.

In some implementations, the agricultural work system includes wherein the modified field plan includes an adjusted plurality passes for dispensing the agricultural product to the field, wherein the adjusted plurality of passes includes dispensing the agricultural product to the coverage gap.

In some implementations, the agricultural work system includes wherein the adjusted plurality of passes includes an overlap portion that overlaps a portion of the field which received a sufficient amount of product during a prior pass, such that the working plurality of the plurality of row units deposits the agricultural product at the coverage gap.

In some implementations, the agricultural work system includes wherein the modified field plan includes a plurality of passes, wherein each of the passes includes a width corresponding to the implement width and adjacent passes of the modified field plan overlap based on the non-working plurality of row units.

In some implementations, the agricultural work system includes wherein the agricultural work system includes a work vehicle coupled to the implement configured to pull the implement in the field.

In some implementations, the agricultural work system includes wherein the controller is configured to facilitate providing the modified field map by generating the modified field plan at the controller, wherein the controller is located at the work vehicle, at the implement, or both.

In some implementations, the agricultural work system includes wherein the controller is configured to facilitate providing the modified field map by transmitting the non-working plurality of row units and the working plurality of row units to an externally located controller.

In some implementations, the agricultural work system includes wherein the agricultural work system includes an autonomous work vehicle pulling the implement through the field.

In some implementations, the agricultural work system includes wherein the controller is configured to facilitate providing the modified field map by generating the modified field plan at the controller, wherein the controller is located at the autonomous work vehicle or at an externally located controller separate from the autonomous work vehicle.

In some implementations, the agricultural work system includes wherein the sensor system includes a product delivery sensor directed to the product delivery system, wherein the product delivery sensor is configured to transmit a second signal configured to identify a lack of the agricultural product being dispensed from the product delivery system to the implement.

In some implementations, the agricultural work system includes wherein the controller is configured to identify a non-working plurality of the plurality of row units that fail to deliver a sufficient amount of agricultural product based on the second signal.

In some implementations, the agricultural work system includes wherein the identified field location includes identifying a coverage gap having a width based on the one or more rows of the modified field plan that that lack dispensed agricultural product.

In another implementation there is provided a method for dispensing agricultural an agricultural product to a field with an implement moving across the field in multiple passes. The implement includes a plurality of row units defining a pass width for each one of the multiple passes, wherein each of the plurality or row units deposits the agricultural product in a row. The method includes: identifying a non-working plurality of the plurality of row units that fail to deliver a sufficient amount of agricultural product; identifying a working plurality of the plurality of row units that deliver a sufficient amount of agricultural product; identifying a coverage gap having a gap width based on the one or more rows of the row units that fail to deliver the sufficient amount of agricultural product; and depositing agricultural product with the working plurality of the plurality of row units at the coverage gap by overlapping adjacent passes of the multiple passes such that the non-working row units are located at some of the plurality of rows having the sufficient amount of product.

In a further implementation, there is provided a work implement for dispensing agricultural product to a field. The work implement includes a plurality of row units and a product delivery system operatively connected to the plurality of row units. The product delivery system is configured to deliver a predetermined delivered amount of product to one or more of the plurality of row units, wherein each of the plurality of row units is configured to dispense a predetermined dispensed amount of product to the field. A sensor system is directed to one of or both of the product delivery system or the plurality of row units, wherein the sensor system is configured to identify an actual delivered amount of product being delivered to one or more of the plurality row units and to identify an actual dispensed amount of product being dispensed by one or more of the plurality of row units. The sensor system transmits a first sensor signal of the actual delivered amount of product being delivered or a second sensor signal of the actual dispensed amount of product being dispensed. A controller is operatively connected to the sensor system and is configured to: receive the first sensor signal or the second sensor signal; determine, based on the first sensor signal, if the actual delivered amount of product being delivered is less than the predetermined delivered amount of product; determine, based on the second sensor signal, if the actual dispensed amount of product being dispensed is less than the predetermined dispensed amount of product; and identify which of the plurality of row units fails to or would fail to deliver a sufficient amount of product based on the first sensor signal or the second sensor signal.

In some implementations, the work implement includes wherein the controller is configured to determine a field plan for dispensing product to the field, wherein the field plan identifies a field location where the one or more plurality row units fail to or would fail to deliver the sufficient amount of product based on the first sensor signal or the second sensor signal.

In some implementations, the work implement includes wherein the field location of the field plan includes an identification of one or more rows of the field in which one or more of the plurality row units fails to or would fail to deliver a sufficient amount of product.

In some implementations, the work implement includes wherein the controller provides a field plan signal to a user interface to display to a user of the user interface the field location where the one or more plurality row units fails to or would fail to deliver a sufficient amount of product.

In some implementations, the work implement includes wherein the controller provides a field plan signal to a machine controller of an autonomous agricultural vehicle, wherein the machine controller directs the autonomous agricultural vehicle to deliver the sufficient amount of product based on the first sensor signal or the second sensor signal.

BRIEF DESCRIPTION OF THE DRAWINGS

The above-mentioned aspects of the present disclosure and the manner of obtaining them will become more apparent and the disclosure itself will be better understood by reference to the following description of the implementations of the disclosure, taken in conjunction with the accompanying drawings.

Corresponding reference numerals are used to indicate corresponding parts throughout the several views.

DETAILED DESCRIPTION

The implementations of the present disclosure described below are not intended to be exhaustive or to limit the disclosure to the precise forms in the following detailed description. Rather, the implementations are chosen and described so that others skilled in the art may appreciate and understand the principles and practices of the present disclosure.

Figure 1:
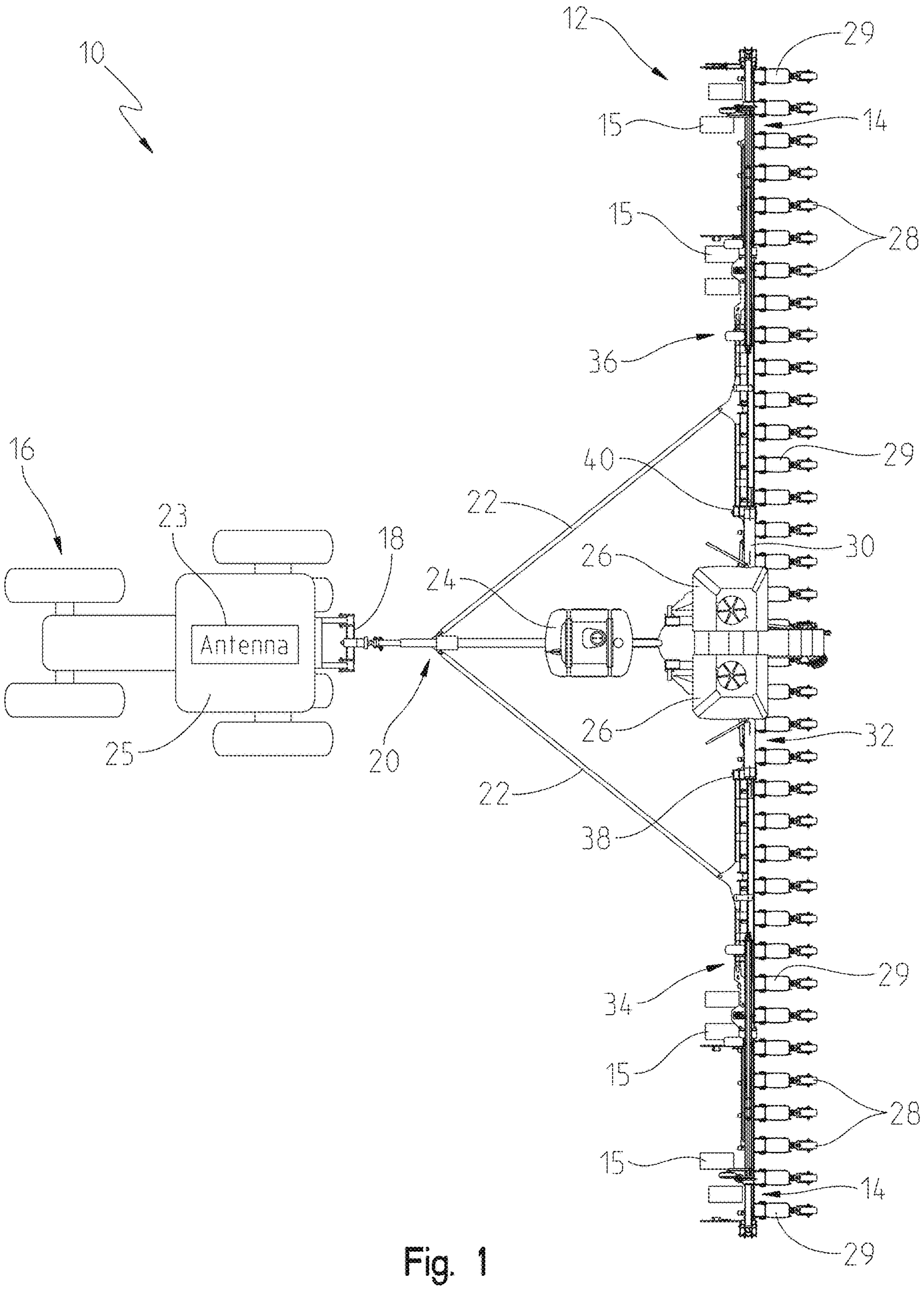
FIG. 1 is a top view of an agricultural system including a farm implement pulled by a work vehicle.

Referring to the drawings, and more particularly to FIG. 1, there is shown an implementation of an agricultural system 10 including an agricultural tool or implement 12. In the implementation shown, the agricultural implement 12 is a planter, but in other implementations, the agricultural tool

12 is a fertilizer spreader or a seeder. The tool 12 includes a toolbar 14 supported by wheels 15. A work vehicle 16, in the form of a tractor, includes a hitch 18 that may be coupled to and move the implement 12 with a suitable coupling arrangement, i.e. towing assembly 20. The towing assembly 20 includes drawbars 22 coupled to the hitch 18 and coupled to the toolbar 14. Other implementations are contemplated including an autonomous machine including a power mover, such as an engine, pulling the implement 12, as well as an entirely self-contained autonomous fertilizer/seeder machine, including the row units and a power mover, are a complete and unitary seeding and/or fertilizer system. In one or more implementations, the work vehicle 16 includes an antenna 23 which may be supported by a cab 25 of the work vehicle 16. In different implementations, the antenna 23 includes but is not limited to a receiving antenna, a transmitting antenna, or a transceiver antenna.

The implement 12 includes a product delivery system including a liquid fertilizer tank 24 and seed hoppers 26. As described herein, each of the liquid fertilizer tank 24 and the seed hoppers 26 are identified as a product container.

In the case of a seeder, the frame/toolbar on a seeder can have up to five (5) sections and may use a separate commodity cart. If a commodity cart is used, the commodity cart may be used as mounting location for a GPS device, such as a receiver, transmitter, or transceiver, in addition to mounting the GPS device on the tractor, on the center toolbar, or on a separate connected implement.

The toolbar 14 includes a number of row units 28. In some implementation, each of the row units 28 include a seed hopper 29. In other implementations, the row units 28 do not include a seed hopper, but receive seed from a centrally located and larger seed hopper or tank, such as seed hopper 29.

Each of the row units 28 may be coupled to the liquid fertilizer tank 24 or seed hoppers 26 of the product delivery system by hoses coupling the row units 28 to one or both of the liquid fertilizer tank 24 or the seed hoppers 26. While a liquid fertilizer tank 24 is illustrated other types of fertilizers and the appropriate fertilizer tank may be used to distribute powder or granular fertilizers. As described herein fertilizer or seed are identified collectively as the product. The product delivery system is configured to deliver a predetermined delivered amount of product to one or more of the plurality of row units, wherein each of the plurality of row units is configured to dispense a predetermined dispensed amount of product to the field.

A center toolbar 30, which is fixedly coupled to a center frame section 32, supports row units 28. The row units 28 are uniformly spaced along the toolbar and deposit product along rows as the implement moves along the field. A first toolbar 34 extends from the center toolbar 30 in a first direction and a second toolbar 36 extends from the center toolbar 32 in a second direction. Both toolbars 28 and 30 support row units During a product delivery operation, the center toolbar 30, the first toolbar 34, and the second toolbar 36 are aligned along the same longitudinally extending axis extending from one end of the toolbar 14 to another end of the toolbar 14. In other implementations, the implement 12 includes a single toolbar supporting multiple row units.

The first toolbar 34 is rotatably coupled to the center toolbar 30 at a first rotatable coupler 38 and the second toolbar 36 is rotatably coupled to center toolbar 30 by a second rotatable coupler 40. Each of the first toolbar 34 and the second toolbar 36 rotate about respective first rotatable coupler 38 and second rotatable coupler 40 for folding toward the work vehicle 16. Once folded, the implement 12 may be transported along a road due to the collapsed nature of the implement 12, as would be understood by one skilled in the art. In other implementations, each of the first toolbar 34 and the second toolbar 36 includes an inner wing and an outer wing, which are also foldable with respect to one another for transportation.

As the implement 12 applies the product in rows along the field, it is important to apply the product uniformly in the rows as well as along the length of the toolbar 14. The seeds are typically deposited along rows defined by the locations of the row units 28 and at rows or areas of the field that previously received fertilizer. The mature crop is typically located in the rows and subsequently harvested.

There may be a number of conditions that affect the uniformity of application the product, which may include various components of the implement 12 being faulty, being damaged, or being blocked. These conditions may include the blocking of hoses that deliver product to the row units 28, faulty hoppers, faulty metering devices, and damaged or blocked nozzles. In some conditions, the product is not applied at all. In other conditions, the product is only partially delivered where the amount of product is insufficient to properly fertilize or properly seed the field. There may be times where sprayer pipes that deliver liquid fertilizer get blocked, because of dust or unwanted materials located in tank 24 or related pipes or hoses. Under these conditions, nozzles of the row units may be completely blocked and no product is applied in that area of the field, until the blockage is fixed. Under some conditions, some of the row units may continue to deposit product while other row units coupled to the toolbar 14 do not deposit product. In other conditions, the row units fail to deposit an adequate or sufficient amount of product.

Figure 2:
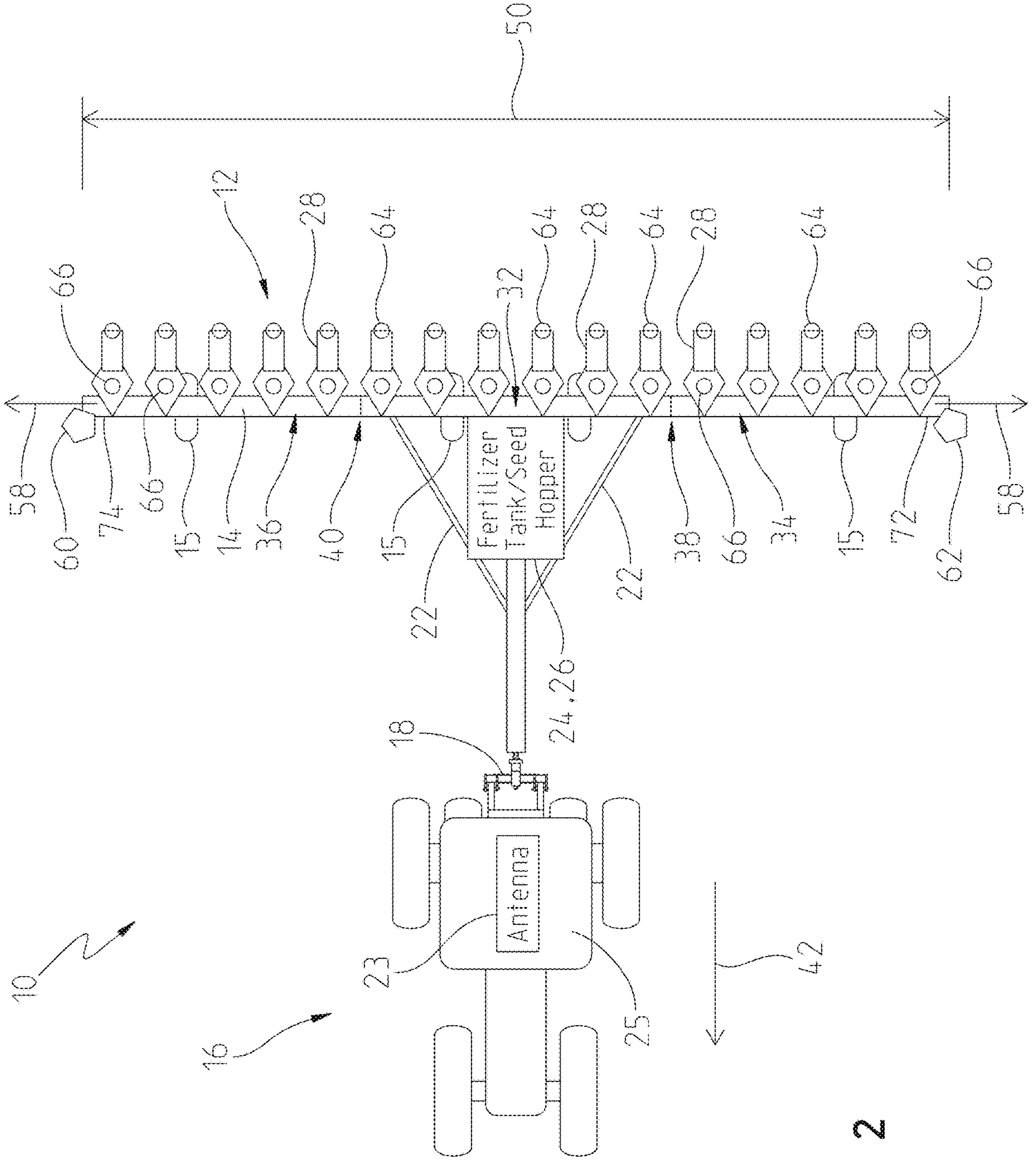
FIG. 2 is a schematic top view of an agricultural system including a single row farm implement, including sensors, pulled by a work vehicle.

FIG. 2 is a schematic top view of the agricultural system 10 including the farm implement 12 pulled by the work vehicle 16 illustrating one or more sensors used to identify an insufficient amount of product or an absence of product being applied to the field. As the farm implement 12 is pulled through the field in a forward direction along a path 42, each of the row units 28, represented schematically, are directed along rows defined by the locations of the row units 28 coupled to center frame section 32, the first toolbar 34, and the second toolbar 36.

In one implementation as illustrated, the toolbar 34 includes fourteen (14) row units 28, the toolbar 36 includes 14 row units 28, and the center frame section 32 includes eight (8) row units 28. Other implementations are also contemplated and include other numbers of row units. In some implementation, the number of row units is not the same from one side toolbar to another side toolbar. In some situations, the operator may remove one or more row units from one side only such that the number of row units is not the same for one toolbar to another toolbar. The tool bar 14 includes a width 50 defined along a longitudinal axis 58.

As the implement 12 moves through the field along the direction 42, one or more of the row units may not deliver a sufficient amount of product to the rows of the field defined by the locations of the row units 28. In this situation, the field will include gaps in product coverage, where product coverage is inadequate. Under these condition, the amount of crop harvested per acre is reduced. The sufficient amount of product is based on a predetermined amount of product sufficient to provide either fertilizer or seed coverage to obtain desired crop for harvesting.

Since product delivery may be inadequate, the vehicle 16 and/or implement 12 includes a sensor system directed to one of or both of the product delivery system or the plurality of row units. The sensor system includes one or more sensors configured to identify an actual delivered amount of product being delivered to one or more of the plurality row units. The sensor system is also configured to identify an actual dispensed amount of product being dispensed by one or more of the plurality of row units. As seen in FIG. 2, an exemplary sensor system includes a first sensor 60 located at one end of the toolbar a second sensor 62 located at another end of the toolbar 12. In this implementation, the sensors 60 and 62 include imaging sensors that are directed to some of or all of the rows in which product is deposited. The image sensors 60 and 62 may include, but are not limited to, imaging devices such as cameras, radar devices, or infrared devices. The imaging sensors 60 and 62 may be directed to one or more of the individual row units 28, or to the field rows that have are located in the field.

In some implementations, each of the row units 28 includes a row unit sensor 64, wherein each of the row unit sensors 64 is configured to identify whether product is being dispensed by the associated row unit. The row unit sensors 64 may be imaging sensors such as sensors 60 and 62, or may be other types of sensors that monitor product flow moving through the row unit. In some implementation, each of the sensors 64 is a nozzle sensor directed to a dispensing nozzle of the row unit 28. One or more hose sensors 66 may also be used at one or more of material delivery hoses (not shown) that couple the tank 24 or the seed hoppers 26 to each of the row units 28. The hose sensors 66 are configured to identify whether the hoses have delivered a predetermined delivered amount of product from the 24, 26 to the row units 28. The hose sensors 66, in different implementations, include pressure sensors, optical sensors, and piezoelectric sensors. In other implementations, the implement includes other image devices, such as cameras, that identify weeds among corn, soybean, and cotton plants. In some implementations, imaging devices enable targeted application of non-residual herbicides on weeds within corn, soybean and cotton fields. These same imaging devices may be used to identify a lack of product or an insufficient product. For instance, when a nozzle is not spraying, it may be an indicator that something is wrong with the hoses or pipes, since there may be a blockage. In the case of a blockage, pressure sensors may be used to identify the blockage as there will be an elevated pressure within the hose or pipe. One or more sensors that detect the blockage may be located on the implement or the vehicle. Pressure sensors may identify an increased pressure level at the area or inadequate coverage spot or one or more cameras may image product delivery.

Each of the row units 28 may fail to deliver a sufficient amount of product under one or more conditions. For instance in one condition, the liquid fertilizer tank 24 or the seed hoppers 26 may fail to deliver product through the hoses. In another condition, the hoses may fail to deliver product to the row units. In a further condition, the row units may fails deliver or dispense product to the field.

Figure 3:
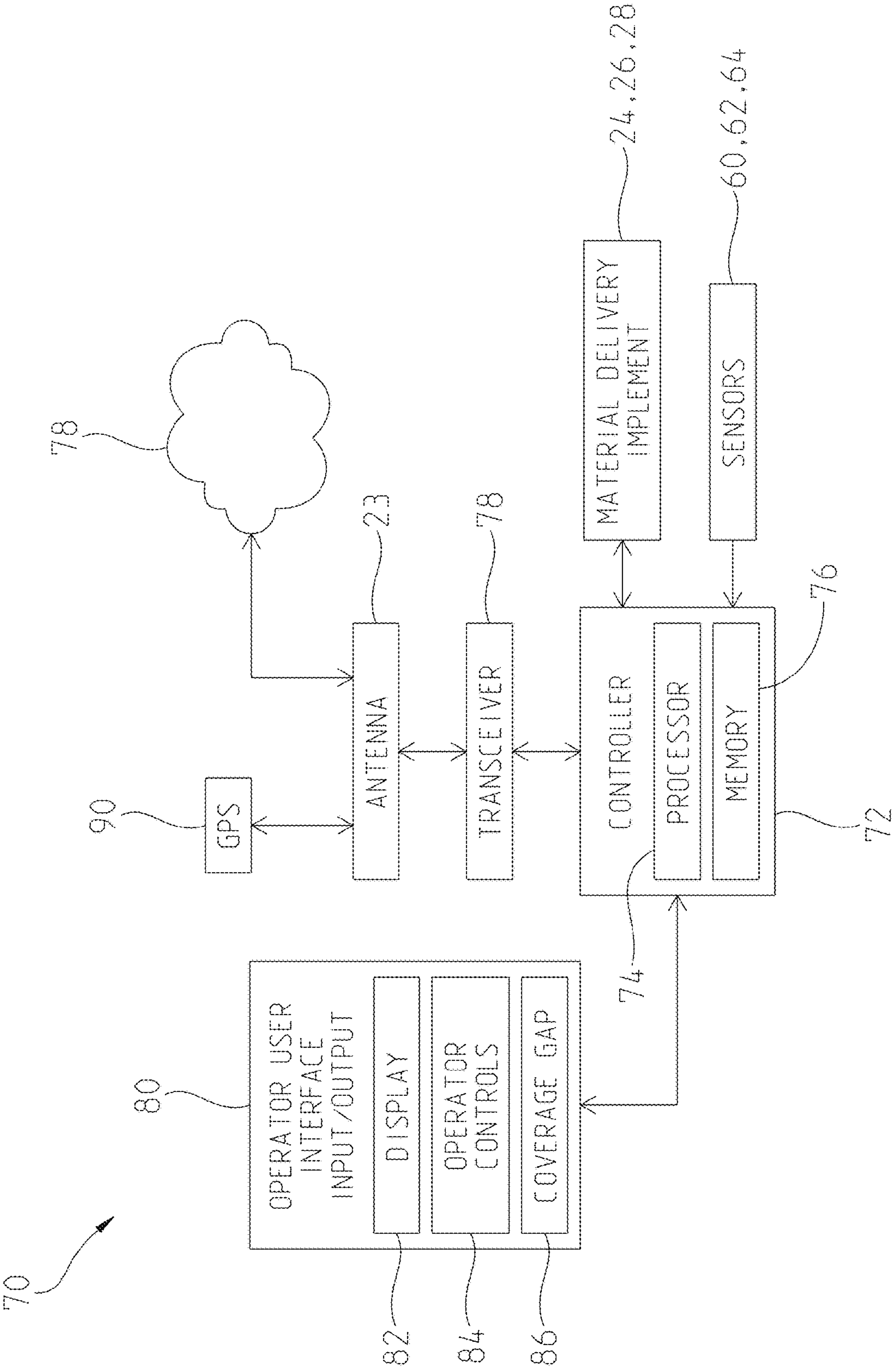
FIG. 3 is a block diagram of a control system configured to determine the delivery of an agricultural product.

FIG. 3 illustrates a schematic block diagram of a control system 70 configured to determine the delivery of a sufficient amount of product, fertilizer or seed, to the field. The control system 70 includes one or more electronic controllers 72, also known as an electronic control unit (ECU), each of which is connected to a controller area network (CAN) bus (not shown) of the agricultural system 10, work implement 12, or the vehicle 16, and to the various devices, systems, parts, or components of the harvester and/or work implement. The CAN bus is configured to transmit electric signals for the control of various devices connected to the bus, as well as to determine status signals that identify the status of the connected devices. In one implementation, the controller 72 is located at the vehicle 16 or the implement 12 or both.

The controller 72, in different implementations, includes a computer, computer system, or other programmable devices. In these and other implementations, the controller 70 includes one or more processors 74 (e.g. microprocessors), and an associated memory 76, which can be internal to the processor or external to the processor. The memory 76 includes, in different implementations, random access memory (RAM) devices comprising the memory storage of the controller 72, as well as any other types of memory, e.g., cache memories, non-volatile or backup memories, programmable memories, or flash memories, and read-only memories. In addition, the memory, in different implementations, includes a memory storage physically located elsewhere from the processing devices, and can include any cache memory in a processing device, as well as any storage capacity used as a virtual memory, e.g., as stored on a mass storage device or another computer coupled to controller 72. The mass storage device can include a cache or other dataspace which can include databases. Memory storage, in other implementations, may be located in a cloud system 78, also known as the "cloud", where the memory is located at a location distant from the machine to provide the stored information wirelessly to the controller 72 through the antenna 23 operatively connected to a transceiver 78, which is operatively connected to the controller 72. When referring to the controller 72, the processor 74, and the memory 76, other types of controllers, processors, and memory are contemplated. Use of the cloud 78 for storing data, in one implementation, leads to storage economies of scale at a centrally located operation's center, where data from a large number of agricultural systems may be stored. In other implementations, data from other types of work machines is stored.

Other work machines, known as autonomous machines, may be controlled remotely without operator or user intervention at the machine itself. In an autonomous machine system, a remote control system is used to remotely control operation of the vehicle 16 through web-based communication tools and platforms with the cloud 78, as is understood by those skilled in the art. In one implementation, an operator, user, or manager is located at a remote control system, which due to its cloud communication protocol, is located remotely from the vehicle 16. In such an implementation, the controller 72 is a distributed control system having components located at one or more of the work machines, the cloud, and the remote control system.

The controller 72 executes or otherwise relies upon computer software applications, components, programs, objects, modules, or data structures, etc. Software routines resident in the included memory 76 of the controller 72, or other memory, are executed in response to the signals received from the sensors 60, 62, 64, and 66. The controller 72 also receives signals from other controllers such as an engine controller and a transmission controller. The controller 72, in other implementations, also relies on one or more computer software applications that are located in the "cloud" 78, where the cloud generally refers to a network storing data and/or computer software programs accessed remotely, such as local cloud functionality not connected to the internet, or mesh networking among machines. The executed software includes one or more specific applications, components, programs, objects, modules or sequences of instructions typically referred to as "program code". The program code includes one or more instructions located in memory and other storage devices which execute the instructions which are resident in memory, which are responsive to other instructions generated by the system, or which are provided at a user interface operated by the user.

An operator user interface 80 is operatively connected to the controller 72, and in one implementation, is located in the cab 25 to display machine information including the sensor information, as well as to enable the user to control operations of the work vehicle 16. The user interface 80 includes a display 82 to display status information directed to the condition or status of the agricultural system 10. Status information includes, but is not limited to, the signals transmitted and received by the sensors 60, 62, 64, and 66. The user interface 80 further includes operator controls 84 configured to enable the user to control the various functions and features of the system 10, or other machine operating systems. A coverage gap user interface 86 is located at the user interface 80 and provides one or more functions. Such functions include, but are not limited to, a display of a status of the liquid fertilizer tank 24, the seed hoppers 26, and the row units 28. Additional information may include one or more field maps. The field maps may be stored in the memory 76, the cloud 78, or both.

The field maps include field information which reflects a status of product that has been dispensed or is being currently dispensed on the field. In one implementation, site map data is stored in the memory 76 or in the cloud 78 and includes a starting profile map, prior to product being dispensed, that includes terrain information that may include an identification of slope or terrain used to identify product coverage for the particular terrain. This map, detailing an unharvested condition of a field, further includes in one or more implementations, data that affects harvesting power such topography, soil type, planted crop inputs, vegetative index, crop moisture, and biomass and/or crop density. These inputs may be provided from technological inputs provided by system sensors such as 2D and 3D sensors that examine the terrain as well as map based farming applications, such as planters, nutrient applicators, drones, geographic information systems (GIS) data, prior years' harvest record data, and other sources of data that is used to determine harvesting power required. on the field.

In these and other implementations, the map data also may include real time updated map data that includes information identifying a current location of the vehicle within the field. In addition, the map data may include an identification of past locations of the vehicle in the field. The map data of the past locations and current location of the vehicle also identifies the locations of product that: 1) has been dispensed, 2) that was either not dispensed or insufficiently dispensed, 3) is currently being dispensed, or 4) is currently not being dispensed or currently being insufficiently dispensed. These identified locations of product are initially determined by one or more of the sensors 60, 62, 64, and 66. In one or more implementations, signals transmitted by each of the sensors 60, 62, 64, and 66 to the controller 72 is used by the controller 72, to identify map locations where product has been adequately dispensed, not dispensed, or insufficiently dispensed.

The controller 72 is operatively connected to the sensor system, including the sensors 60, 62, 64, and 66. Other sensors may be located at the liquid fertilizer tank 24 and the seed hoppers 26 to determine the flow of product from and through each of the fertilizer tank 24 and the seed hoppers 26. The controller 72 is configured to receive sensor signals from each of the sensors and to determine, based on the received sensor signals, if an actual amount of delivered of product being delivered to the row units 28 is less than a predetermined delivered amount of product. For instance, the fertilizer tank 24 and/or the seed hoppers 26 are each configured to delivers a predetermined amount of fertilizer or seed to the row units 28. Each of the sensors 60, 62, and 64 are configured to identify whether the actual amount of product being dispensed by the row units is less than a predetermined amount of product and to transmit signals identifying the actual amount of product being dispensed.

Upon receipt of the signals transmitted by sensor 60, 62, and 64 as well as status signals transmitted by sensor located at the fertilizer tank 24 of seed hoppers 26, the controller 72 identifies which of the plurality of row units fails to or would fail to deliver a sufficient amount of product based on the sensor signals.

In different implementations, a map, based on the map data of product locations, includes an identification of one or more rows in the field where product coverage is insufficient due to malfunctioning, broken, or defective components of the implement 12. The map, having data identifying the misapplication of product, includes areas of the field where there is a coverage gap in the field where an insufficient application of product has been applied. Since the sensors have identified one or more coverage gaps and the location of the sensors is known, coverage gaps may be identified based on which of the nozzles or hoses have failed to apply a predetermined amount of product. In one implementation, a coverage gap 86 in the map data is displayed at the user interface 80. In other implementations, the coverage gap 86 is transmitted to the cloud 78 for storage and later use.

If a coverage gap has been identified, an operative width of the implement, where one or more nozzles have not dispensed the sufficient amount of product, may be modified. For instance, if the nozzle or nozzles are located at an end of the implement, the operative width of implement of the implement is reduced by a distance between a first inoperative nozzle to a last inoperative nozzle located along the implement. Inoperative as used here refers do a nozzle dispensing an inadequate amount of product resulting from a faulty nozzle or inadequate delivery of product to the nozzle This operative width is less than an actual or original operative width of the implement and may be adjusted by the controller 72. The reduced implement width is then used by the controller to provide a new plan, i.e. a replan, for depositing product on the field during runtime such that the identified coverage gaps may have product applied by operative nozzles. In this implementation, the portion of implement having the inoperative nozzles overlaps a portion of the field which received an adequate amount of product, such that a portion of the implement having working nozzles deposits product at the coverage gap. The replan of the field accommodates the lack of working nozzles by adjusting the travel path of the implement through the field.

In one implantation, the replan is provided by the controller where the controller generates new guidance lines (e.g. new paths) with different parameters. Since there is a blockage, the area with the coverage gap will have to be re-covered by adjusting the position of the implement as it travels through the field. The replan reflects a different implement width based on inoperative nozzles. In one implementation, the controller 72 identifies the portion of the field that has not yet been worked, e.g. the uncovered field, and generates a replan which includes adjusting a working path of the implement through the field. After this replan, an intentional overlap of the implement between a new pass and a prior pass is generated by the controller. The replan is configured to provide a field that has full coverage of product. In some implantations, the replan may apply product to portions of the field that have had previously applied product.

The identification of the coverage gap, in one implementation, generates a failure mode, indicating an inadequate amount of product being dispensed. The failure mode may be transmitted by a failure mode signal transmitted to the display 82 for viewing. Based on a condition of the failure mode, the operator may adjust a path of the machine at run time which will trigger replanning of the existing uncovered field. The operator no longer has to manually drive to the identified coverage gaps to cover those gaps with product. Instead, the operator may replan the field which enables the operator to dispense product at the coverage gaps while at the same time dispensing product on portions of the field that have not yet received product.

This solution is inclusive in that the replan of the field may be applied when the agricultural machine is in an autonomy mode or when an operator is controlling the machine while sitting in the cab. The autonomy mode may include a completely autonomous vehicle with an operator located at the vehicle, or a vehicle having a selectable autonomous mode, or a manual mode having a cab where an operator may sit. By identifying what portion of the field is covered with product and what portion is not covered with product, the controller 72 identifies the uncovered area, i.e. the coverage gaps, and may replan only the remaining part of the field to include dispensing product at the coverage gaps.

The controller 72 may receive coverage gap information from a GPS system 90, which includes data records. In one implementation, the GPS system 90 generates map data that identifies areas of the field that have been covered with product and areas of the field that have not been adequately covered with product. This data includes information which identifies covered and uncovered areas. While the GPS system generally refers generically to satellite systems, other specific types of GPS systems are contemplated. For instance, Europe has Galileo as a GNSS system, Russia has GLONASS system, China has BeiDou system, and the US has the GPS system.

By dispensing product to the coverage gap, while at the same time dispensing product to field areas not previously covered, total product dispensing time is reduced, when compared to the vehicle specifically returning to the coverage gaps. While there may be a greater operating time running the machine compared to when there were no failures, overall operating time may be reduced, since the operator or autonomous machine does not have to return to specific locations in the field to apply product to the coverage gaps.

In one or more implementations, the machine may stop for a period of time, such as a few seconds or more when the replan operation is being determined by the controller. In one implementation, the operator may stop the machine for the replan. In the case of an autonomous machine, the machine may be stopped autonomously by the machine controller. In another implementation, the replan operation is determined in the background while the operator is continuing the current work. In an operator controlled machine, the display 80 may display a pop-up window, providing an option to the operator of whether to replan the field or to continue with an existing or current field configuration. In the autonomy mode, the pop-up window may be notified through an operations center or any cloud-based application. The user may also set this default to ON, where the re-plan is triggered every time when there is a fault or blockage and needs to re-plan.

Figure 4:
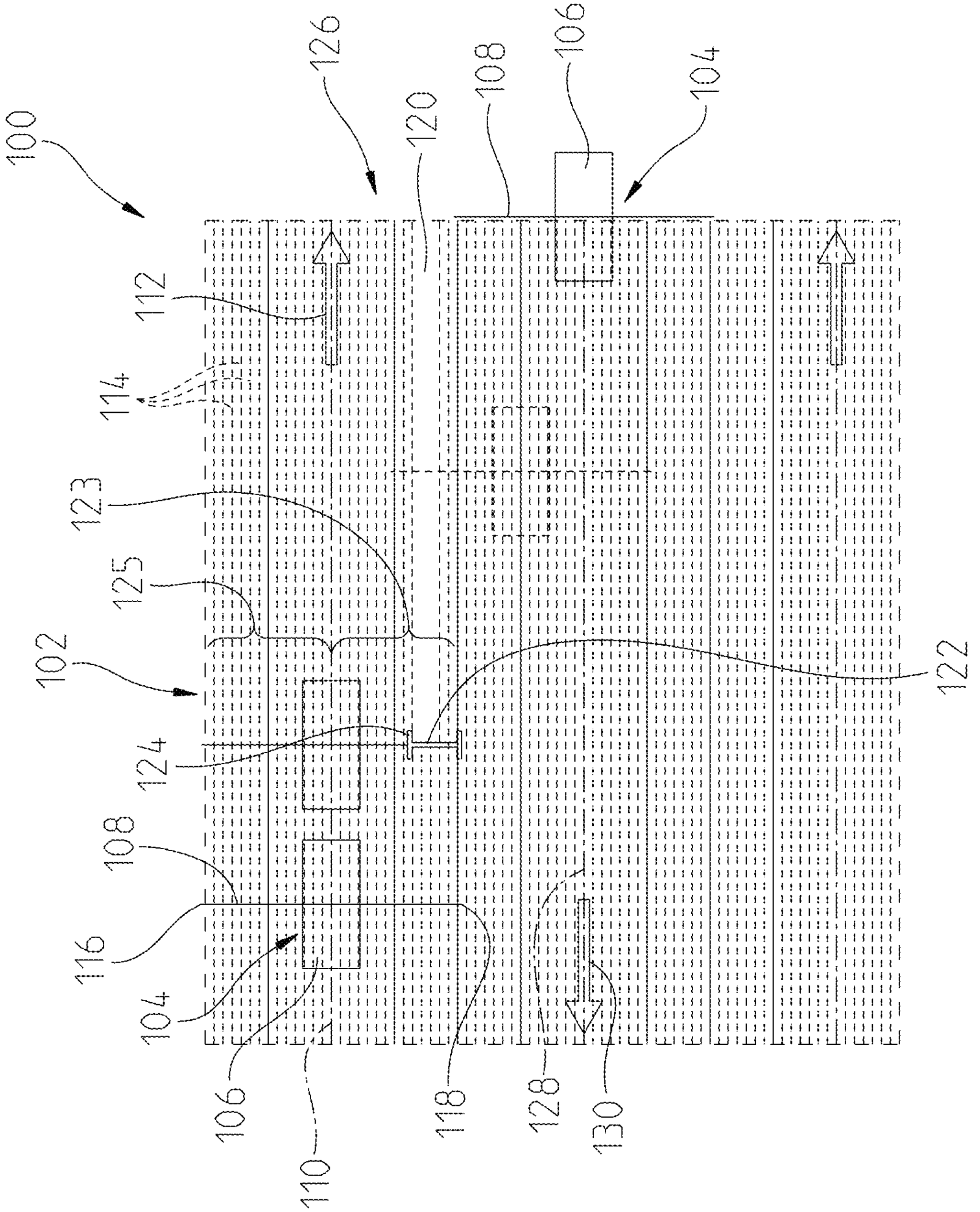
FIG. 4 illustrates a known plan for depositing agricultural product on the field.

FIG. 4 illustrates a known plan 100 for depositing product on the field 102. An agricultural product delivery system 104 includes a vehicle 106 including a toolbar 108 moving along a path 110, here illustrated schematically. As the toolbar 108 moves along the path 110 in a first direction 112, product is delivered at rows 114 located between a first end 116 and a second end 118 of the toolbar. A coverage gap 120 starts when one or more nozzles of the toolbar 108 at a portion 122 of a section of the toolbar 108 fails to deliver a sufficient amount of product. The portion 122 of the toolbar 108 is located on a first side 123 of the toolbar 108. A second side 125 of the toolbar 108 does not include nonfunctioning nozzles in this example.

As seen here, the portion 122 includes some nozzles which fail to deliver a sufficient amount of product and some which deliver a sufficient amount of product. The portion 122 is located between the second end 118 and an inner location 124. This result is shown at the coverage gap 120 where some rows 114 at the portion 122 have deposited product and some rows have not. The coverage gap 120 may include some but not all of the rows 114 between the second end 118 and the inner location 124. The coverage gap 120 extends to an edge 126 of the field. Once the vehicle 106 finishes the path 110, the vehicle 106 makes a turn of about 180 degrees and moves along a second path 128 in the direction 130. As the vehicle 106 moves along the path 128, the coverage gap 120 remains without product coverage.

Figure 5:
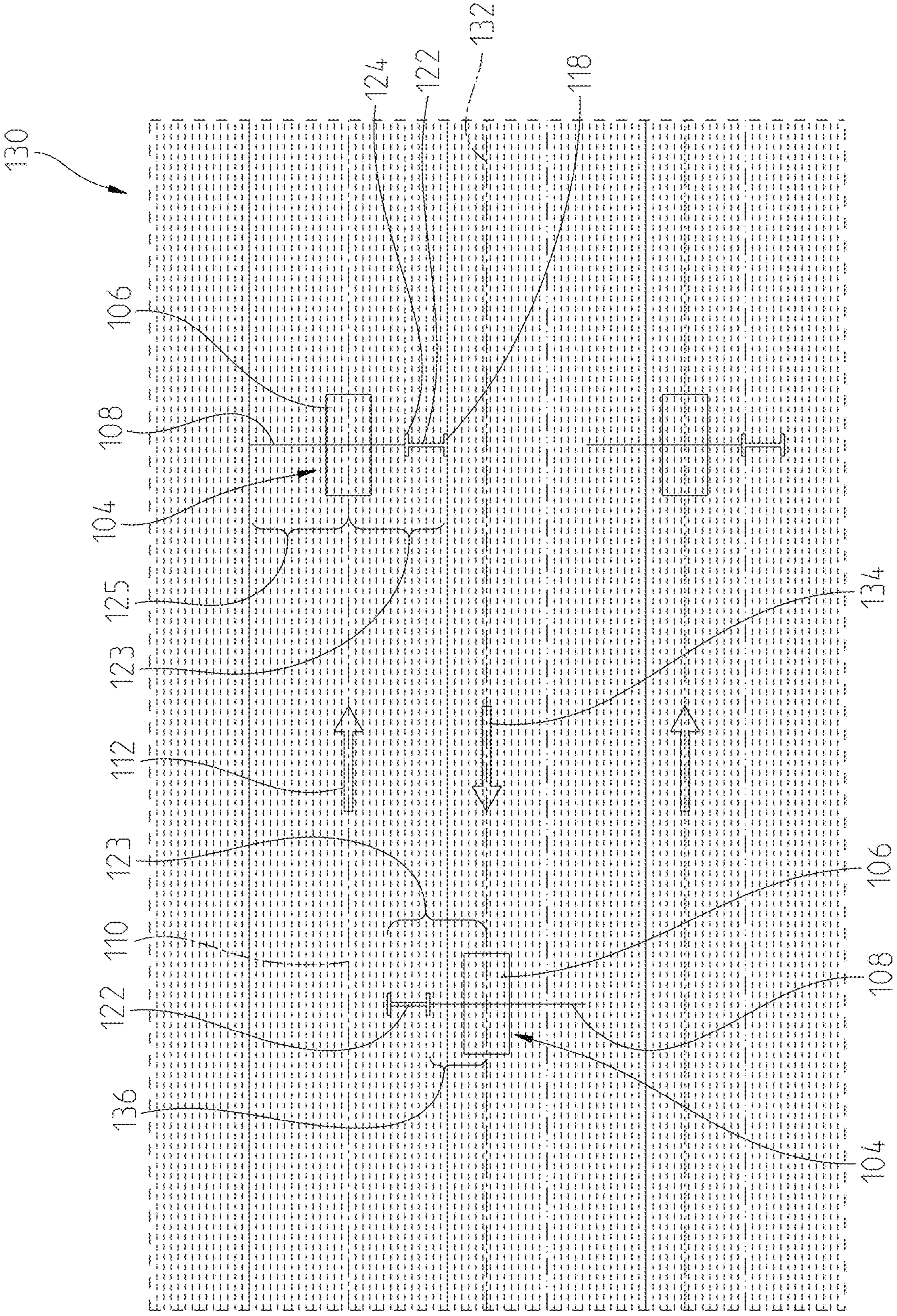
FIG. 5 illustrates a replan for depositing agricultural product on the field.

FIG. 5 illustrates a replan operation 130 of the vehicle 106 moving along the path 110 in the first direction 112 and the vehicle 106 moving along a path 132 in a second direction 134. The coverage gap 120 is not shown, since the path 132 of replan operation 130 distributes product in the coverage gap 120 as the vehicle 106 moves along the path 132. As seen in FIG. 5, the path 132 of the vehicle 106 is adjusted when compared to the path 128 of FIG. 4. To apply product to the coverage gap 120, the first side 123, when moving along the path 132, overlaps rows of the field previously traversed by the vehicle 106 along the path 110. A functioning portion 136 of the first side 123 moves over the coverage gap 120 to deposit product, while the portion 122 moves over an overlap portion of the field where product has been previously deposited during the first path 110. In this implementation, as the toolbar 108 moves along the path 132, the coverage gap 120 includes product deposited by toolbar 108. The product deposited by the toolbar 108 during the first path 110 includes product deposited only once, since the portion 122 of the toolbar 108 moving along the second path 132 is not capable of distributing the adequate amount of product.

Figure 6:
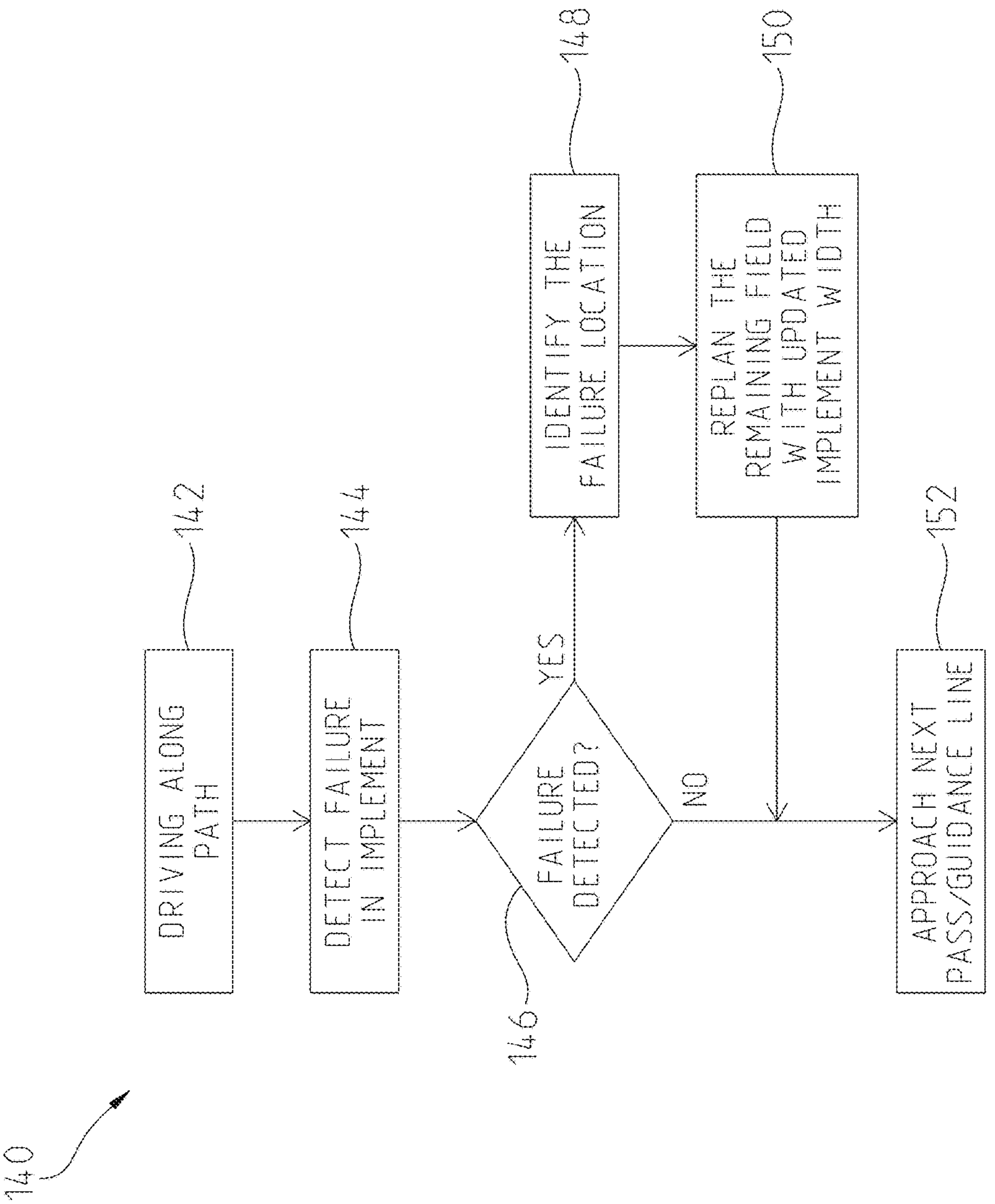
FIG. 6 illustrates one implementation a process to apply agricultural product to a field with an agricultural product delivery system.

FIG. 6 illustrates one implementation of a block diagram 140 of a process to apply product to a field with the product delivery system 104. At block 142, the vehicle 106 is moving through the field 130 along one of the paths while delivering product. While the vehicle 106 is moving, a failure to deliver sufficient product to one or more rows of the field may be detected at block 144. At this block, the controller 72 monitors for the detection of a failure to deliver sufficient product at one or more of the nozzles. Once the controller 72 receives one or more signals from the sensors, a decision is made at block 146 to determine if an actual failure is detected. If yes, the controller identifies a location of the failure at block 148. The failure location may include one or more nozzles. Once the location is identified, the controller 72, or other externally located controllers, such as those located in the cloud 78, provide a replan of the remaining field with an updated width of the implement 108 at block 150. Once the replan is established at block 150, the vehicle 106 moves along the field at block 152 according to the replan. If, however, it is determined at block 146 that no failure is detected, the vehicle 106 moves along the field at block 152 based on the originally determined field plan which did not take into consideration any nonfunctioning nozzles.

While exemplary implementations incorporating the principles of the present disclosure have been described hereinabove, the present disclosure is not limited to the described implementations. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. An agricultural work system for dispensing agricultural product to a field in a plurality of passes based on a field plan, the agricultural work system comprising:

an implement including a plurality of row units defining an implement width of one of the plurality of passes, wherein each of the plurality of row units is configured to dispense the agricultural product to the field in rows across the implement width of the one of the plurality of passes;

a product delivery system, operatively connected to the plurality of row units, configured to deliver the agricultural product to the plurality of row units;

a sensor system directed to the plurality of row units, wherein the sensor system is configured to transmit a first signal configured to identify a lack of the agricultural product being dispensed from one or more of the plurality of row units; and a controller, operatively connected to the sensor system, the controller configured to:

identify a non-working plurality of the plurality of row units that fail to deliver a sufficient amount of agricultural product based on the first signal;

identify a working plurality of the plurality of row units that deliver a sufficient amount of agricultural product based on the first signal; and facilitate providing a modified field plan for dispensing the agricultural product to the field, wherein the modified field plan identifies a field location of the non-working plurality of row units that fail to deliver the sufficient amount of agricultural product when dispensing the agricultural product to the field, including identifying a coverage gap having a width based on the one or more rows of the modified field plan that lack the sufficient amount of agricultural product;

wherein the modified field plan includes an adjusted plurality of passes for dispensing the agricultural product to the field, wherein the adjusted plurality of passes includes dispensing the agricultural product to the coverage gap; and wherein the adjusted plurality of passes includes an overlap portion that overlaps a portion of the field which received a sufficient amount of agricultural product during a prior pass, such that the working plurality of the plurality of row units deposits the agricultural product at the coverage gap.

2. The agricultural work system of claim 1 wherein the coverage gap includes a plurality of rows wherein each row of the plurality of rows corresponds to one of the non-working plurality of row units that fail to deliver the sufficient amount of agricultural product.

3. The agricultural work system of claim 1 wherein the modified field plan includes a plurality of passes, wherein each of the plurality of passes includes a width corresponding to the implement width and adjacent passes of the modified field plan overlap based on the non-working plurality of row units.

4. The agricultural work system of claim 3 wherein the agricultural work system includes a work vehicle coupled to the implement configured to pull the implement in the field.

5. The agricultural work system of claim 4 wherein the controller is configured to facilitate providing a modified field map by generating the modified field plan at the controller, wherein the controller is located at the work vehicle, at the implement, or both.

6. The agricultural work system of claim 4 wherein the controller is configured to facilitate providing a modified field map by transmitting the non-working plurality of row units and the working plurality of row units to an externally located controller.

7. The agricultural work system of claim 3 wherein the agricultural work system includes an autonomous work vehicle pulling the implement through the field.

8. The agricultural work system of claim 7 wherein the controller is configured to facilitate providing a modified field map by generating the modified field plan at the controller, wherein the controller is located at the autonomous work vehicle or at an externally located controller separate from the autonomous work vehicle.

9. The agricultural system of claim 1, wherein the sensor system includes a product delivery sensor directed to the product delivery system, wherein the product delivery sensor is configured to transmit a second signal configured to identify a lack of the agricultural product being dispensed from the product delivery system to the implement.

10. The agricultural system of claim 9 wherein the controller is configured to identify the non-working plurality of the plurality of row units that fail to deliver the sufficient amount of agricultural product based on the second signal.

11. A method for dispensing an agricultural product to a field with an implement moving across the field in multiple passes, wherein the implement includes a plurality of row units defining a pass width for each one of the multiple passes, wherein each of the plurality or row units deposits the agricultural product in a row, the method comprising:

identifying a non-working plurality of the plurality of row units that fail to deliver a sufficient amount of agricultural product;

identifying a working plurality of the plurality of row units that deliver a sufficient amount of agricultural product;

identifying a coverage gap having a gap width based on the one or more rows of the plurality of row units that fail to deliver the sufficient amount of agricultural product; and depositing the agricultural product with the working plurality of the plurality of row units at the coverage gap by overlapping adjacent passes of the multiple passes such that the non-working plurality of the plurality of row units are located at some of a plurality of rows having received the sufficient amount of agricultural product during a prior pass.

12. A work implement for dispensing agricultural product to a field, the work implement comprising:

a plurality of row units;

a product delivery system operatively connected to the plurality of row units, wherein the product delivery system is configured to deliver a predetermined delivered amount of agricultural product to one or more of the plurality of row units, and wherein each of the plurality of row units is configured to dispense a predetermined dispensed amount of agricultural product to the field;

a sensor system directed to one of or both of the product delivery system or the plurality of row units, wherein the sensor system is configured to identify an actual delivered amount of agricultural product being delivered to one or more of the plurality row units and to identify an actual dispensed amount of agricultural product being dispensed by one or more of the plurality of row units, and wherein the sensor system transmits a first sensor signal of the actual delivered amount of agricultural product being delivered or a second sensor signal of the actual dispensed amount of agricultural product being dispensed;

a controller, operatively connected to the sensor system, the controller configured to:

receive the first sensor signal or the second sensor signal;

determine, based on the first sensor signal, if the actual delivered amount of agricultural product being delivered is less than the predetermined delivered amount of agricultural product;

determine, based on the second sensor signal, if the actual dispensed amount of agricultural product being dispensed is less than the predetermined dispensed amount of agricultural product;

identify which of the plurality of row units fails to or would fail to deliver a sufficient amount of agricultural product based on the first sensor signal or the second sensor signal;

identify a coverage gap having a gap width based on the one or more rows of the plurality of row units that fail to or would fail to deliver the sufficient amount of agricultural product to the field; and deposit agricultural product at the coverage gap by overlapping a portion of the field which received a sufficient amount of agricultural product during a prior pass.

13. The work implement of claim 12 wherein the controller is configured to determine a field plan for dispensing agricultural product to the field, wherein the field plan identifies a field location where the one or more plurality row units fail to or would fail to deliver the sufficient amount of agricultural product based on the first sensor signal or the second sensor signal.

14. The work implement of claim 13 wherein the field location of the field plan includes an identification of one or more rows of the field in which one or more of the plurality of row units fails to or would fail to deliver the sufficient amount of agricultural product.

15. The work implement of claim 14 wherein the controller provides a field plan signal to a user interface to display to a user of the user interface the field location where the one or more of the plurality of row units fails to or would fail to deliver the sufficient amount of agricultural product.

16. The work implement of claim 14 wherein the controller provides a field plan signal to a machine controller of an autonomous agricultural vehicle, wherein the machine controller directs the autonomous agricultural vehicle to deliver the sufficient amount of agricultural product based on the first sensor signal or the second sensor signal.

* * * * *